United States Patent [19]

Slawson

[11] 4,193,416
[45] Mar. 18, 1980

[54] THERMAL RESPONSIVE VALVE

[75] Inventor: Richard S. Slawson, Barrington, R.I.

[73] Assignee: G. W. Dahl Company, Inc., Bristol, R.I.

[21] Appl. No.: 873,737

[22] Filed: Jan. 30, 1978

[51] Int. Cl.² .............................................. F16K 17/38
[52] U.S. Cl. ........................................ 137/75; 137/72; 169/42
[58] Field of Search ................................... 137/72–77; 169/19, 41, 42, 57, 90

[56] References Cited

U.S. PATENT DOCUMENTS

| 306,662 | 10/1884 | Stratton | 137/72 X |
| 2,137,685 | 11/1938 | Gillen | 251/274 X |
| 3,587,747 | 6/1971 | Romero et al. | 169/42 X |
| 3,659,624 | 5/1972 | Kelly et al. | 137/75 |
| 3,916,930 | 11/1975 | Erickson | 137/75 |

Primary Examiner—Martin P. Schwadron
Assistant Examiner—Richard Gerard
Attorney, Agent, or Firm—Salter & Michaelson

[57] ABSTRACT

A thermal responsive valve including a valve body in which a member is movable between a first position and a second position but normally restrained from such movement by restraining means including a pair of pins held into contact with such member by means of a frame. The frame is of a generally closed planar configuration and includes a base portion to which a pair of spaced portions are interconnected by means of a pair of flexible rods. The spaced portions are in turn interconnected to each other by a link which is separable, such as by being fusible upon reaching a predetermined temperature level, or frangible in response to some form of external signal. The frame is positioned with respect to the valve body or a housing outwardly extending therefrom in such a manner that the pins are laterally held by the frame into contact with the movable member and block such member from moving to its second position by the action of a spring. As soon as the link separates, outward force upon the pin adjacent the spaced frame portions, forces such spaced portions outwardly from each other so as to permit the pins to move out of contact with the member and accordingly enable it to move to its second position.

17 Claims, 5 Drawing Figures

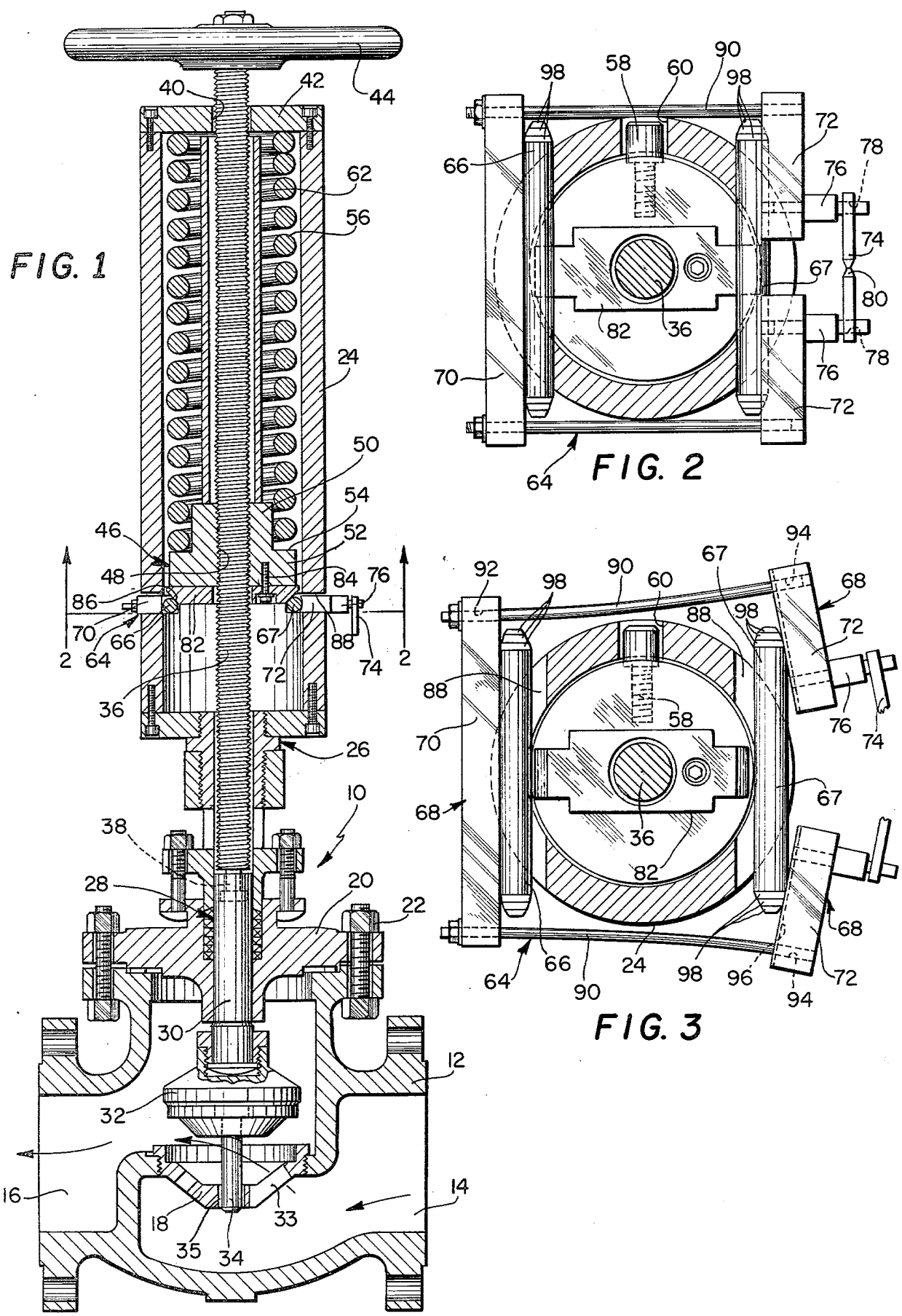

THERMAL RESPONSIVE VALVE

BACKGROUND AND SUMMARY OF THE INVENTION

This invention generally relates to valves and more particularly to a valve construction which will automatically either open or close in response to a previously predetermined ambient temperature level. Valves of this type are in common use and generally include a body having a flow path defined therethrough in which a movable valve member such as a stem or stem portion is aligned to move relative to a valve seat. Obviously the direction in which these stem or stem portions move in relationship to the valve seat is depended on the operational manner of the valve desired for a particular purpose, that is, the valve can be designed to automatically either open or close.

A spring or other resilient means is utilized to urge the movable valve member to its second position; however, such action is normally counteracted by restraining means engaged with the member so as to normally block such movement. The restraining means include a link separable as by fusing upon reaching a predetermined temperature level or frangible as upon receipt of an external signal, thereby triggering a series of mechanical movements enabling the valve member to move to its second position.

Examples of such devices are shown in U.S. Pat. No. 3,916,930 issued Nov. 4, 1975 and assigned to the assignee of the present application and applicant's co-pending application Ser. No. 865,016 entitled THERMAL VALVE filed Dec. 27, 1977. Although such constructions are particularly suited for a wide variety of small and medium sized valve installations, it would be desirable to provide a valve of a modified and novel construction particularly suited for larger type valve installations, i.e. suitable for use in valves 3 to 4 inches in diameter or larger.

It is accordingly a primary object of the present invention to produce a thermally responsive valve in which the restraining means normally acting to prevent movement of the valve member to a second position is retained in position in a novel manner particularly suited for large valve constructions in which considerable force is exerted upon the movable valve member.

A further object of the present invention is the provision of a novel valve construction in which an urging force of relatively large magnitude may be blocked from moving a valve member to a second position by at least one movable member in turn restrained by spaced portions in turn interconnected by means of a separable link which will separate as upon reaching a predetermined ambient temperature level or other external signal.

These and other objects of the present invention are accomplished by providing a valve body having a valve member adapted to be moved from a first to a second position by the action of an urging force thereupon. The force is restrained by means of a restraining device in the form of a generally planar closed configuration frame in which a portion of said frame includes a separable link. The link serves to interconnect spaced frame portions which in turn contact at least one elongated pin and maintain such pin in lateral contact with the movable member in its intended path of travel so as to temporarily block its movement. When the link is broken, the spaced portions are free to outwardly deflect away from each other by the action of a pair of flexible rods connecting them to a base portion of the frame. The valve can be reset to its first position by means of a unique resetting mechanism including a hub threadably received on a threaded portion of the movable member and restrained from rotation therewith such that the hub will move longitudinally relative to the housing to compress the spring within the housing when the movable member is rotated as by an attached hand wheel.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention:

FIG. 1 is an elevational sectional view of a valve construction embodying the present invention;

FIG. 2 is a view partially in section taken along the line 2—2 of FIG. 1;

FIG. 3 is a view similar to FIG. 2 but showing the valve in its second or activated position;

DESCRIPTION OF THE INVENTION

Figure 5:
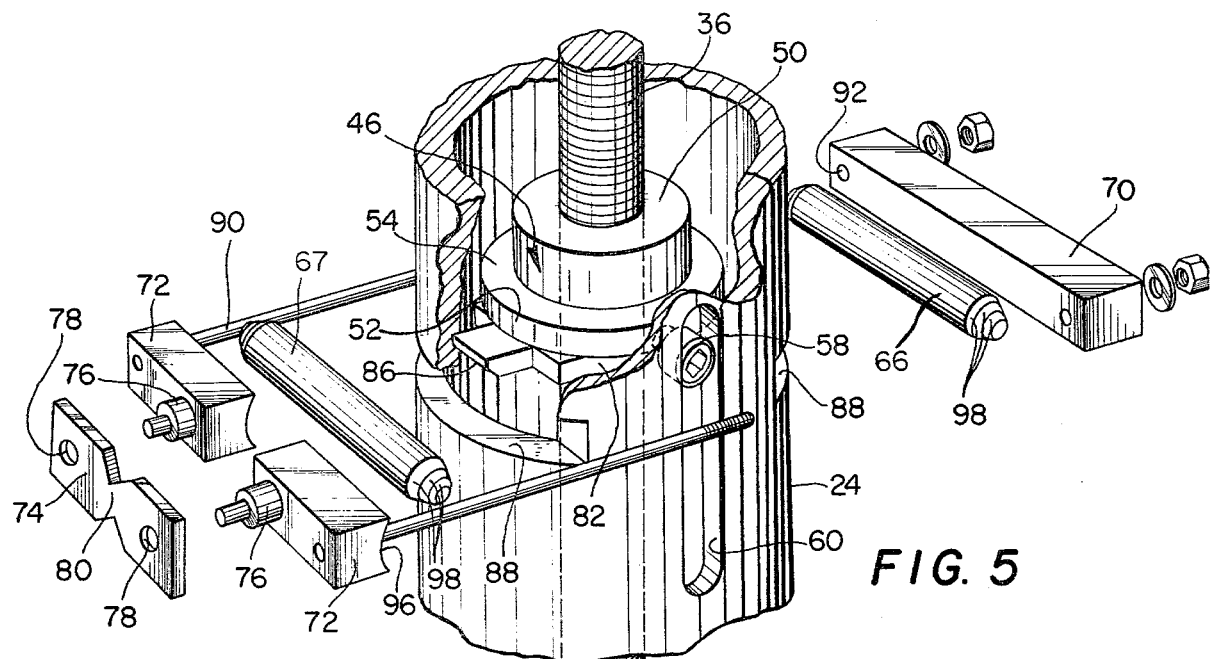
FIG. 5 is a partial perspective view with parts thereof in exploded position.

The valve 10 of the present invention includes a valve body 12 having an inlet chamber 14 and an outlet chamber 16 through which fluid may be directed via a valve seat 18. The valve body 12 includes a bonnet 20 suitably secured thereto by means of nuts and bolts 22. The bonnet 20 in turn is adapted to receive a longitudinally orientated generally cylindrical housing 24 by means of suitable threaded interconnecting means 26. A movable valve member 28 is mounted with respect to the bonnet 20, the housing 24 and the interconnection means 26 in such a manner that it is supported thereby and capable of moving relative to the valve seat 18 from a first position, i.e. one in which the movable member 28 is displaced from the valve seat and thus the valve is open, to a second or operational position in which the movable member contacts the valve seat and the valve is in a closed position. The above positioning describes the action of an automatic shut-off valve but it should be clear that the present invention is not so limited and may, by simply reversing the abovedescribed positions, function in a normally closed position.

The movable valve member 28 includes a stem portion 30 at one end to which a closure head 32 is suitably secured as by a standard threaded connection so that the closure member 32 may seat with the valve seat 18 and accordingly block fluid flow through the open portions 33 of the web or spider in part forming the valve seat. A lead pin 34 may extend through a central opening 35 in the valve seat 18 and thus serve as a guide for closing such open portions or openings 33.

Figure 4:
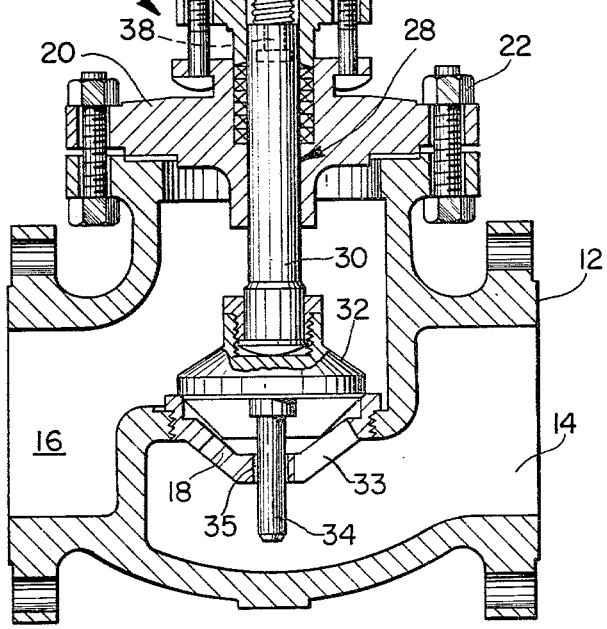
FIG. 4 is a partial elevational view of the valve construction of the present invention similar to that shown in FIG. 1 but in its activated position.

The other end of the movable member 28 is provided with a longitudinally orientated threaded rod 36 connected thereto by means of a T-slot construction 38 which enables the rod 36 to freely rotate relative to the stem portion 30, yet provide an axial connection therewith so that the movable member 28 moves as a unit axially with respect to the valve body 12 and the housing 24. The upper end of the rod 36 extends through a smooth wall opening 40 within an end plate 42 attracted to the housing 24 and is provided at such end with a wheel 44 affixed thereto. The wheel enables the rod 36 to be rotated relative to the housing 24 and the stem portion 30. A hub 46 having a central threaded bore 48 is threadably engaged to the rod 36. The hub includes a boss 50 and a laterally extending flange 52 which forms a seat 54 against which a spring 56 is adapted to engage. In order that the hub 46 will not rotationally turn along with the threaded rod 36, the hub is provided with an outwardly extending screw 58, the head of which is adapted for disposition within a longitudinally or vertically orientated slot 60 formed within a portion of the housing 24. In this manner then, turning of wheel 44 enables the hub 46 to travel axially upwardly with respect to the housing 24 so as to compress the spring 56. The upward travel of the hub 46 and accordingly the compressional level of the spring 56 is determined by a stop 62 in the form of a cylindrical shell disposed about the threaded rod 36 and interiorly of the spring 56. One end of the stop contacts the boss 50 and the other end is adapted to contact the end plate 42. By turning the hand wheel 44, the position of the threaded rod 36 and accordingly the valve stem portion 30 is determined. Thus the valve can be set in various positions from fully closed to fully open independent of a restraining means 64. Once so positioned, the valve will remain in such position until the restraining means is activated, i.e. fired, to force the valve into a fully closed position as shown in FIG. 4. Once the valve has reached its full travel extent (FIG. 4) as by firing the valve or by turning the handwheel 44, further turning of the handwheel will move the hub 46 upwardly in the housing thereby compressing spring 56 to a position as shown in FIG. 1 wherein the restraining means 64 may be reset if required.

The restraining means 64 includes movable means in the form of a pair of longitudinally orientated pins 66, 67 and spaced retaining means 68 in contact with such pins. Such retaining means includes a base portion 70, contacting pin 66 and a pair of separate spaced portions 72 contacting pin 67 and interconnected to each other by means of a separable link 74. The separable link may be fusible upon reaching a predetermined ambient temperature level, frangible upon receipt of an electrical signal or otherwise separable. The link is in turn mounted to the separate portions 72 by means of mounting extensions 76, one of which is provided on each of the separate portions 72 and is in turn positioned within openings 78 provided on either end of the link 74. At least the central portion 80 of the link separates as upon reaching a predetermined level of ambient temperature which will cause activation of the valve to its second position as will hereinafter be more fully explained.

The lower face of the hub 50 is provided with a bearing member 82 fixed thereto by means of a bolt 84, or may be formed integral therewith. The outer faces or edges 86 of such bearing member 82 are downwardly inwardly slanted so that when the pins 66, 67 are laterally contacted thereby, the force exerted by the spring 56 and transmitted to the pins via such faces 86 will tend to direct the pins outwardly of the housing 24. In order to position the pins as above indicated, the housing includes a pair of laterally directed slots 88 positioned opposite to each other and into which the pins may be received. Intermediate portions of the pins extend into the interior of the housing 24 and in contact with the bearing member 82 as above described. Also as best shown in FIG. 2, the pins also contact opposite sides of the housing along parallel chordal lines directed with respect to the housing 24. The pins are accordingly positioned adjacent the inner closed side of the slots 88 and beneath portions of the flange 52.

The restraining means 64 normally retains the pins 66, 67 in such position within the slots 88 against the downwardly outwardly directed urging force by the spring 56. Such restraining means 64 is formed in the configuration of a closed sided frame in which the base portion 70 and the separated portions 72 comprise opposite sides thereof and are interconnected by means of a pair of flexible, springy rods 90. The rods 90 are positioned at opposite ends of the base portion 70 through openings 92 provided at such ends and into the outer ends of the separate portions 72 as by threaded engagement with bores 94 provided therein. The rods 90 are flexible enough so that they permit the separate portions 72 to be pivotally or flexibly moved apart from each other once the link 74 is separated by action of the pin 67 against the inner surfaces 96 thereof. The inner surfaces 96 adjacent the separate portions 72 are preferably arcuately tapered so as to form a pocket for the receipt of pin 67. Thus, when the pin 67 is forced outwardly upon firing of the valve, the cradling effect of the pocket restrains it from sliding across such inner surfaces at least until it has lost a significant amount of momentum, at which point its possible separation from the restraining means 64 poses no danger.

The frame components as well as the pins are generally formed of highly corrosion resistant materials such as unhardened stainless steel since the environments in which the valves are utilized are often corrosive. The contacting surfaces of such restraining means which slide relative to each other in order that the movable valve member may move to its second position may therefore exhibit considerable frictional resistance to moving, and accordingly rolling movement of the pins 66, 67 at least across the slots 88 generally takes place. However, it is possible in an alternative form to construct the base portion 70 from the pin 66 as by increasing its length and providing an opening at each end thereof for receipt of the rods 90. In such case, the pin 66 would not roll but would skid across the slot.

The outer ends of the pin 67 are provided with at least one and preferably several chamfered surfaces 98 adapted to sequentially contact the grooved inner surface of the separate portions 72. The most inward of such chamfered surfaces 98, that is, that disposed adjacent the body of the pin 67 is the least tapered and the tapers of such surfaces become progressively more steep so that the separate portions 72 are driven more progressively apart from each other in the opening movement thereof as best shown by the movement between FIGS. 2 and 3 of the drawings. During such movement, one of such chamfered surfaces 98 will always be in contact with the inner surface of the groove 96 so as to enhance the outward progressive forcing of such separate sections 72 of the frame. Alternatively, the pin ends may have rounded ends simulating such progressively arcuate tapers. Although there is no need to provide such chamfered or arcuate surface on the ends of the pin 66, generally both pins are so shaped so that no confusion will exist in reassembling the restraining means 64 after an activation thereof.

The construction of the restraining means 64 also enables a relatively wide range of forces acting on the pins to be adequately retained by the retaining means. Thus by extending the length of the mounting extensions 76, the length of the moment arm through which tension applied by the separable link acts may be increased, thus reducing the physical strength required of such link. This moment arm would be slightly greater than the distance between the inner surfaces 96 and the point of attachment between the link and the extensions 76, and thus it may be seen that increasing the length of the extensions increases this moment arm, and thus the effect which a fixed strength link has in retaining the pin 67 from forcing apart the separated portions 72. A moment arm is also present between the ends of the pin 67 which contact surfaces 96 and the rods 90. This space may be increased or decreased to respectively increase or decrease the effect of the force exerted by the pin ends against the separate portions 72 about their point of connection to the rods 90. Thus, sizing the pin ends adjacent the rods would reduce this moment effect such that the effect of the tension force exerted by the rods 90 is minimized.

Once the pins have been outwardly driven through the slots 88 and out of contact with the bearing member 82, the urging force of the spring 56 will drive the hub and consequently the rod 36 which is threadably connected to the hub, axially downwardly as a unit so as to fully close the valve from whatever open or partially open position it had been set in by the handwheel 44. Such action is shown in the progression between FIGS. 1 and 4 of the drawings. It should also be pointed out that during such axial travel, any rotational movement of the hub 46 with respect to the rod 36 is again prevented by means of the interengagement of the screw 58 within the vertical orientated housing slot 60.

Also by varying the angle of incline of the faces 86, the lateral force component transmitted to the pins can be varied so as to increase or decrease such force upon pins 66 and 67. By making this angle more shallow, the lateral force component on the pins is reduced and thus the strength of the link 74 of the restraining means 64 may be reduced. Alternatively by increasing the angle of contact between faces 86 and pins 66, 67, the lateral outwardly directed force component and the resultant effect of the spring 56 increased.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A thermal responsive valve comprising a valve body having a flow path therthrough, a member within said body movable between a first position wherein said flow path is open and a second position wherein said flow path is closed, means normally urging said movable member towards said second position, restraining means associated with said member for normally holding said member in said first position, said restraining means including movable means and retaining means for said movable means, said movable means normally positioned in blocking contact with said member so as to prevent movement thereof by said urging means, said retaining means having separate spaced portions normally in contact with said movable means and a separable link interconnecting said spaced portions and under tension thereby, at least one of said spaced portions mounted for outward deflection with respect to said movable means and movable to a second and further spaced apart position, whereby when said link separates due to a predetermined external condition, said spaced portions move to said second position thereof thus permitting said movable means to move with respect to said member and out of holding relationship therewith which in turn enables said urging means to move said member to said second position, said movable means comprising at least one elongated pin having a portion thereof disposed in lateral contact with and in the travel path of said member, said urging means continually urging said member against said pin, the movement of said spaced portions to said second position thereof adapted to release said pin so that said member can force such pin out of its travel path.

2. The valve set forth in claim 1, the opposite ends of said pin having chamfered surfaces in contact with said spaced portions so as to deflect said portions apart from each other.

3. The valve set forth in claim 1, there being a pair of pins disposed on either side of said member, said pins disposed within an enclosed frame formed by said spaced portions on one side and a base portion on the opposite side thereto and by a pair of flexible members connecting said base portion to said spaced portions, said flexible members adapted to outwardly flex about said base portion so as to permit said spaced members to move further apart from each other.

4. The valve set forth in claim 3, said frame maintaining said pins in contact with said movable member.

5. The valve set forth in claim 3, the other of said pins forming said base portion of said frame.

6. A thermal responsive valve comprising a valve body having a flow path therethrough, a member within said body movable between a first position wherein said flow path is open and a second position wherein said flow path is closed, means normally urging said movable member towards said second position, restraining means associated with said member for normally holding said member in said first position, said restraining means including movable means and retaining means for said movable means, said movable means normally positioned in blocking contact with said member so as to prevent movement thereof by said urging means, said retaining means having separate spaced portions normally in contact with said movable means and a separable link interconnecting said spaced portions and under tension thereby, at least one of said spaced portions mounted for outward deflection with respect to said movable means and movable to a second and further spaced apart position, whereby when said link separates due to a predetermined external condition, said spaced portions move to said second position thereof thus permitting said movable means to move with respect to said member and out of holding relationship therewith which in turn enables said urging means to move said member to said second position, said movable means comprising at least one elongated pin having a portion thereof disposed in lateral contact with and in the travel path of said member, said urging means continually urging said member against said pin, the movement of said spaced portions to said second position thereof adapted to release said pin so that said member can force such pin out of its travel path, an exterior housing associated with said body, said movable member extending into said housing, said restraining means including a frame positioned about said housing, said movable means including a pair of elongated pins laterally contacting said movable member within the travel path of said movable member, said retaining means forming a side of said frame, said spaced portions maintaining said pins in contact with said movable member while said fusible link is intact, said frame further permitting said spaced portions to move apart from each other when said link is separated.

7. The valve set forth in claim 6, said frame being of closed perimeter and enclosing a segment of said housing generally normally disposed to the travel path of said movable member.

8. The valve set forth in claim 7, said frame formed by said spaced portions on one side and a base portion on the opposite side thereto and by a pair of flexible members connecting said base portion to said spaced portions, said flexible members adapted to spread apart from each other about said base portion so as to permit said spaced portions to move to their said second position.

9. The valve set forth in claim 8, said flexible members being a pair of springy rods.

10. The valve set forth in claim 9, said rods being stainless steel.

11. The valve set forth in claim 8, said movable member being the valve stem, said stem having a longitudinally orientated threaded rod extending into said housing and adapted for free longitudinal movement relative thereto, said threaded rod having a hub threadably connected thereto, said hub having means in contact with said pins in said first position, said housing having opposed lateral slots through which intermediate sections of said pins extend into said housing, said means for urging said movable member being a spring disposed within said housing and in contact with an opposite face of said hub.

12. The valve set forth in claim 11, the opposite ends of said pins having at least one chamfered portion adapted for contact with said spaced portions so as to outwardly deflect said spaced portions apart from each other, thus permitting said hub to force said pins through said slots.

13. The valve set forth in claim 12, at least one of said pins having a plurality of adjacent chamfered surfaces at each end thereof, each of said surfaces of a progressively greater inclination towards the centerline of said pin such that said pin ends serve to progressively force apart said spaced apart portions at progressively greater angles.

14. The valve set forth in claim 11, said hub means having an outwardly directed slanted surface contacting said pins.

15. The valve set forth in claim 11, including means for repositioning said movable member to said first position, said repositioning means including means for rotating said threaded rod and means for restraining said hub from rotation with said threaded rod such that said hub will travel longitudinally with respect to said threaded rod upon said rotation thereof.

16. The valve set forth in claim 15, said housing having a longitudinally orientated slot, said hub having an extension adapted to extend into said longitudinally orientated slot.

17. The valve set forth in claim 16, said valve stem and said threaded rod longitudinally interconnected for free relative rotation with respect to each other.

* * * * *